AUXILIARY LEG AND BRACKET ASSEMBLY FOR BEDFRAMES

Filed Dec. 11, 1967

INVENTOR.
NORMAN A. PRICE
BY
*Oldham & Oldham*
ATTORNEYS.

3,497,881

AUXILIARY LEG AND BRACKET ASSEMBLY FOR BEDFRAMES

Norman A. Price, Shaker Heights, Ohio, assignor to Rusco Industries, Inc., Bedford Heights, Ohio, a corporation of Ohio Filed Dec. 11, 1967, Ser. No. 696,676
Int. Cl. A47c *23/06*
U.S. Cl. 5—310 4 Claims

ABSTRACT OF THE DISCLOSURE

An angle bracket is provided as a support for a bedframe having a metal angle support rail therein and which angle bracket has a vertical leg and a horizontal leg with the horizontal leg being of substantially flattened U-shape and having an open end adjacent the plane of the vertical leg, which flattened horizontal angle bracket leg is adapted to engage with the horizontal leg of the metal angle rail. A support means is secured to the lower portion of the horizontal leg of the angle bracket and extends downwardly therefrom for support action for the angle bracket and any means engaged thereby.

The present invention relates to special supports for bedframes or other similar articles including horizontally positioned metal angles, or rails having a horizontal leg and a vertical leg and wherein special supports are required intermediate the ends of such metal angle rails.

Heretofore there have been various efforts made to provide special support means in Hollywood bedframes and the like and center supports have been made that extend longitudinally of a bedframe intermediate the lateral margins thereof, or they may extend transversely of the bedframe intermediate the ends thereof, where any special size or load problem exists in the bedframe or other unit when it is in use. None of such previous devices have been completely satisfactory for one or more reasons. In bedframes and similar articles of furniture, cost is always an appreciable factor, and prior support structures, insofar as I am aware, have all been relatively expensive to build, or have other problems inherent in the manufacture, use and/or assembly thereof.

The general object of the present invention is to provide a novel and improved support for use with bedframes and similar articles of furniture and wherein the support of the invention is characterized by the provision of a flattened, substantially U-shaped section as one leg or section in an angle bracket member whereby such flattened section is adapted for engagement with the horizontal leg of a metal angle rail or the like and where suitable support means may also be attached to the angle bracket and extend downwardly therefrom to engage the support surface.

Another object of the invention is to provide a special angle means for engagement with a rail of a metal Hollywood bedframe for local support action therewith.

A further object of the invention is to provide a cross rail and support means for removable reinforcing engagement with a bedframe.

Another object of the invention is to provide a relatively inexpensive, but sturdy support for use with a Hollywood bedframe and wherein the support can be made from substantially conventional materials by low cost fabricating operations and which support is quite easy to engage with and be retained on a rail in the Hollywood bedframe.

The foregoing and other objects of the invention will be made more apparent as the specification proceeds.

In order to understand the invention completely, reference should be had to the accompanying drawings, wherein.

When referring to corresponding members shown in the drawing and referred to in the specification, corresponding numerals are used to facilitate comparison therebetween.

Figure 1:
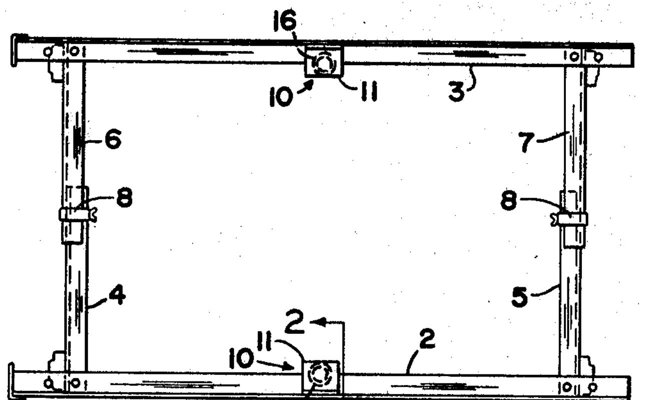
FIG. 1 is a plan view, to a reduced scale, of a bedframe having a pair of supports embodying the principles of the invention engaged therewith.

Attention now is directed to the details of the structure shown in the accompanying drawings, and a bedframe is indicated as a whole by the numeral 1. Such bedframe is of the type, for example, as is shown in U.S. Patents Nos. 2,607,051 or 2,911,656. The bedframe 1 includes a pair of side rails 2 and 3, while a pair of cross rail sections 4 and 5, and 6 and 7 are pivotally or otherwise suitably attached to each of the side rails 2 and 3, respectively, adjacent the ends thereof. These cross rail sections are of such a length that they normally are positioned in telescopic or overlapped association with a similar cross rail section carried by the opposite side rail. Any suitable clamp means 8 are used to secure the adjacent ends of the cross rail sections 4 and 6 and 5 and 7 together, respectively.

Figure 2:
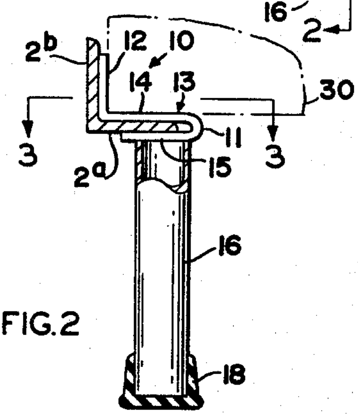
FIG. 2 is an enlarged view, partially shown in vertical section, of the bedframe of FIG. 1 taken on line 2—2 thereof.
Figure 3:
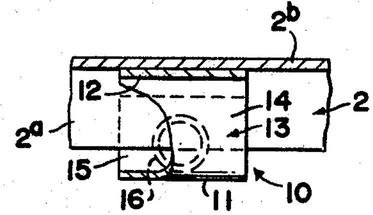
FIG. 3 is a fragmentary sectional view taken on line 3—3 of FIG. 2.

As an important feature of the present invention, a support, indicated as a whole by the numeral 10, is provided for removable engagement with one or both of the side rails 2 and 3 of the bedframe 1. Each of these side rails, when normally operatively positioned, includes a horizontal leg, in this instance **2*a*, and a vertically extending leg 2*b*, as indicated in FIG. 2. The support 10 is adapted to be engaged with the horizontal leg 2*a*, as indicated in FIG. 2 of the drawings. The support 10 includes an angle bracket 11 which has a vertically extending leg or section 12, and a horizontally extending leg or section 13. The horizontal section can be said to be substantially of a flattened U-shape and it has its open face or end facing out towards a plane defined by the vertical leg 12 of the angle bracket 11, or else lying in such plane, or adjacent thereto. FIG. 2 shows that this horizontal leg or section 13 of the angle bracket has a unitary upper part 14 and a lower part or engaging section 15 and that the horizontal leg 2*a* of the side rail 2 is received in or engaged by such horizontal section or leg 13 between the parts 14 and 15 thereof. Normally, the length of the upper part 14 is such that the vertically extending leg 12 of the angle bracket 11 normally will abut against the vertically extending leg 2*b* of the side rail 2, as indicated in FIG. 2, for compact association of the angle bracket 11 with such side rail 2 and with the angle bracket 11 obviously being adapted to engage the side rail 2 at any desired location thereon. These vertical legs 12 and 2*b* need not be, but usually are, in contact to fix the angle bracket 11** in position.

To complete the support 10, any suitable support means 16, such as a tubular leg 16 is secured, as by welding, to the lower surface of the lower part 15 of the horizontal section of the angle bracket. If desired, and end cap 18, glide, caster or other member can be removably or otherwise attached to the end of the tubular leg 16. Obviously, such tubular leg 16 is made of such height that it will provide a reenforcing or support action for the side rail 2 intermediate the ends thereof for load support by the support means 10 without any appreciable deflection of the side rail 2.

The angle bracket 11 is retained in position by a box spring 30 carried by the side rails 2 and 3 and the angle bracket does not noticeably change the positioning of the box spring.

Figure 4:
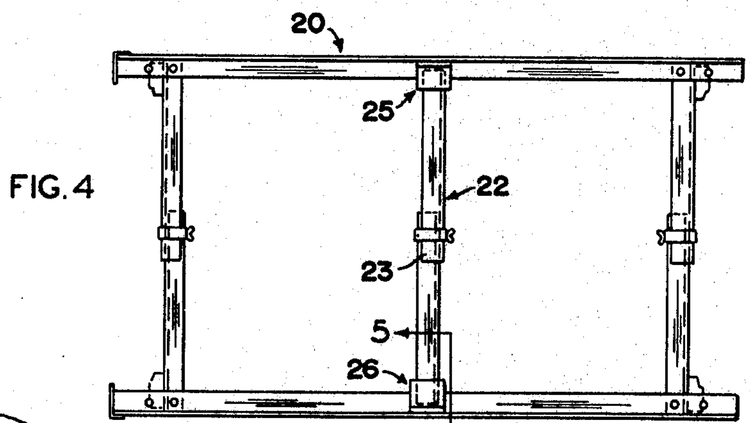
FIG. 4 is a plan view of a bedframe having a cross rail comprising a further embodiment of the invention operatively engaged therewith.
Figure 5:
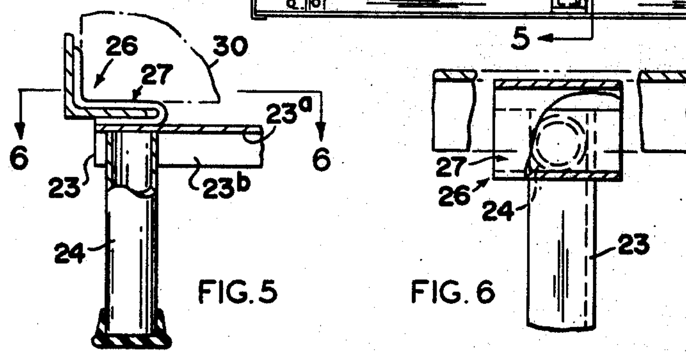
FIG. 5 is an enlarged fragmentary vertical section taken on line 5—5 of FIG. 4.
Figure 6:
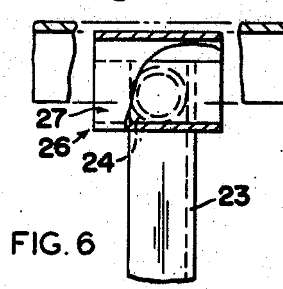
FIG. 6 is a fragmentary horizontal section, with parts being broken away for clarity, taken on line 6—6 of FIG. 5.

In FIGS. 4 through 6 of the drawings, a modified bedframe 20 is shown which is of the same general construction as the bedframe 1. However, in this instance, the bedframe has a transversely extending support 22, including a cross rail 23, removably associated therewith and secured thereto. This cross rail may be made in one section or in two telescopically adjustable sections. The cross rail 23, in use, has one horizontally positioned leg **23*a* and a vertically positioned leg 23*b* which normally extends downwardly from one marginal edge of the horizontal leg 23*a***.

In this embodiment of the invention, a pair of support devices, such as legs 24, are individually attached to the ends of the cross rail 23, as by being welded to either the horizontal leg **23*a* and/or the vertically extending leg 23*b* of such cross rail. The support 22 of the invention then is completed by attaching individual angle brackets 25 and 26 to the ends of the cross rail 23. Each of these support brackets 25 and 26 is of the same construction as the angle bracket 11, except that in this instance, the support brackets 25 and 26 are suitably attached to the cross rail 23 so that the open end of a U-shaped section 27 of the support brackets extends or faces axially outwardly of the cross rail 23, as indicated in FIG. 5. Again, the flattened U-shaped section 27 is provided at the lower portion of each of the support brackets for engagement with the horizontal leg of the side rail of the bedframe 20. The clamp means on the cross rail 23 may be loosened to facilitate engaging the brackets 25 and 26 with the side rails. In all events, this embodiment of the invention provides a reenforcing cross rail intermediate the ends of the bedframe 20** whereby a removable but sturdy unit is provided to reenforce the bedframe and prevent undesired deflection thereof.

It will be realized that, by the particular angle brackets disclosed herein, such brackets do not interfere in any appreciable manner with the engagement and support of the set of box springs 30, or the like, by the bedframe 20 or other furniture unit with which the angle bracket and support means of the invention are associated.

Relative terms such as "vertical," "upper," etc. are used in the specification and claims in relation to the normal position in use of the apparatus of the invention.

The novel supports of the invention are made from relatively conventional components as the angle brackets 11 can be readily made from metal plate or strip, as desired, and be cut to suitable lengths. In all events, a sturdy, relatively inexpensive support means has been provided and such support means can be readily engaged with bedframes and other items of furniture for local support action in any desired portions thereof. Suitable support members are attached to the angle brackets of the invention to extend down to the normal support surface to provide the ultimate load carrying means for the support means of the invention. Thus, it is believed that the objects of the invention have been achieved.

While two complete embodiments of the invention have been disclosed herein, it will be appreciated that modification of these particular embodiments of the invention may be resorted to without departing from the scope of the invention.

What is claimed is:

1. A center support for a metal rail bedframe comprising a metal cross rail means having a horizontal leg and a vertical leg extending downwardly from said horizontal leg, support means attached to said cross rail means and extending downwardly therefrom, and a pair of angle brackets individually attached to opposite ends of said cross rail means on the upper surface thereof, each of said angle brackets including a vertical leg and a flattened U-shaped horizontal leg having an upper section attached to said vertical leg and a lower section, the open end of such horizontal leg facing axially outwardly of said cross rail means and being adapted to receive and engage a horizontal leg of a metal rail of the bedframe therein.

2. A center support as in claim 1 where the vertical legs of said angle brackets are adapted to abut on vertical legs of a pair of opposed metal bedframe rails.

3. A support for a bedframe or other article including a horizontally positioned metal angle having a horizontal leg and a vertical leg extending upwardly from said horizontal leg and which is characterized by an angle bracket having a vertical leg and a horizontal leg, said horizontal leg being of generally flattened U-shape with upper and lower sections forming an open end adjacent and below said vertical leg of said angle bracket, and a support means operatively secured to the lower surface of said lower section of said horizontal leg and extending downwardly therefrom whereby the support can be telescoped into engagement with said metal angle by engaging the horizontal leg thereof between the sections of said horizontal leg of said angle bracket.

4. A support as in claim 3 where the vertical leg of said angle bracket extends upwardly from said horizontal leg and said vertical leg is adapted to abut against the vertical leg of the metal angle when said angle bracket is operatively positioned.

References Cited

UNITED STATES PATENTS

| | | | |
|---|---|---|---|
| 1,014,452 | 1/1912 | Chinter | 5—238 |
| 2,599,723 | 6/1952 | Row | 5—310 |
| 2,617,125 | 11/1952 | Leefeldt | 5—310 |

BOBBY R. GAY, Primary Examiner

ANDREW M. CALVERT, Assistant Examiner

U.S. Cl. X.R.

5—238